(12) United States Patent
Akimoto

(10) Patent No.: US 7,661,398 B2
(45) Date of Patent: Feb. 16, 2010

(54) CONTROL DEVICE AND CONTROL METHOD OF INTERNAL COMBUSTION ENGINE

(75) Inventor: Hikokazu Akimoto, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 148 days.

(21) Appl. No.: 11/907,181

(22) Filed: Oct. 10, 2007

(65) Prior Publication Data

US 2008/0228373 A1 Sep. 18, 2008

(30) Foreign Application Priority Data

Nov. 24, 2006 (JP) ............... 2006-317536

(51) Int. Cl.
*F01L 1/34* (2006.01)
(52) U.S. Cl. .................. 123/90.17; 123/90.15
(58) Field of Classification Search ............ 123/90.15, 123/90.17, 90.31
See application file for complete search history.

(56) References Cited

U.S. PATENT DOCUMENTS

2005/0098130 A1* 5/2005 Hirowatari et al. ....... 123/90.17

FOREIGN PATENT DOCUMENTS

| JP | 03-217629 | 9/1991 |
| JP | 09-324686 | 12/1997 |
| JP | 10-318002 | 12/1998 |
| JP | 2004-068809 | 3/2004 |
| JP | 2004-360617 | 12/2004 |

* cited by examiner

*Primary Examiner*—Zelalem Eshete
(74) *Attorney, Agent, or Firm*—Kenyon & Kenyon LLP

(57) ABSTRACT

An ECU executes a program including steps of estimating an oil temperature based on a water temperature sensed by a water temperature sensor, setting NE(1) to a lower limit value of an engine revolution speed NE when the oil temperature is equal to or higher than a threshold THO(0), setting NE(2) (NE(2)<NE(1)) to the lower limit value of engine revolution speed NE when the oil temperature is lower than the threshold THO(0), and controlling an engine driving an oil pump to keep the engine revolution speed NE equal to or higher than the set lower limit value.

9 Claims, 9 Drawing Sheets

F I G. 5
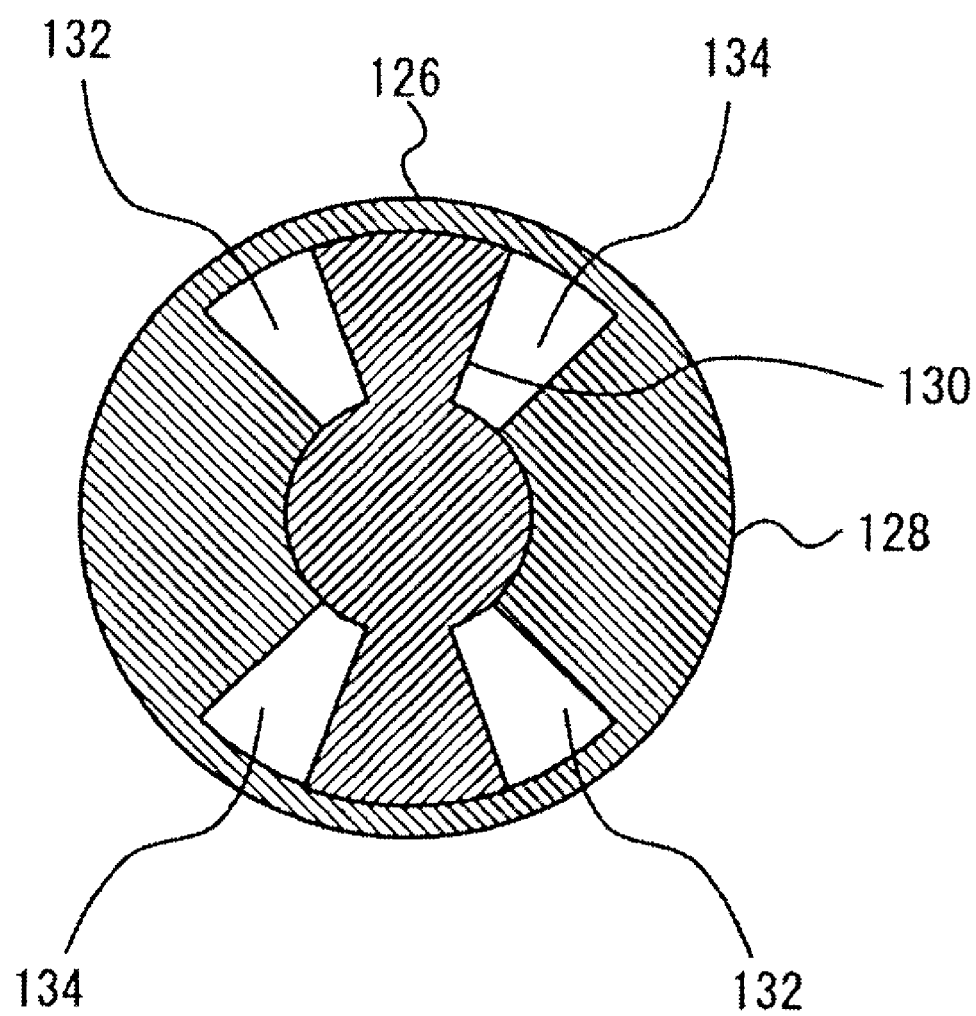

CONTROL DEVICE AND CONTROL METHOD OF INTERNAL COMBUSTION ENGINE

This nonprovisional application is based on Japanese Patent Application No. 2006-317536 filed with the Japan Patent Office on Nov. 24, 2006, the entire contents of which are hereby incorporated by reference.

BACKGROUND OF THE INVENTION

1. Field of the Invention

The present invention relates generally to control devices and control methods of internal combustion engines, and particularly to a technology of controlling an internal combustion engine having a changing mechanism that changes opening/closing timing of at least one of an intake valve and an exhaust valve.

2. Description of the Background Art

A VVT (Variable Valve Timing) mechanism that is operated by a hydraulic pressure to change opening/closing timing (phases) of an intake valve and/or an exhaust valve has been known. The VVT mechanism changes the opening/closing timing to achieve an optimum amount of air supplied into a cylinder as well as an optimum amount of EGR (Exhaust Gas Recirculation) according to an operation state of an internal combustion engine. A hydraulic fluid of the VVT mechanism has characteristics that change significantly according to a temperature of the hydraulic fluid. Therefore, it is desired to give consideration to the temperature of the hydraulic fluid for accurately controlling the VVT mechanism.

Japanese Patent Laying-Open No. 2004-68809 has disclosed a control method for CVVT (Continuously Variable Valve Timing) of an automobile engine, and particularly a method of estimating a fluid temperature from a start state of the engine and controlling the CVVT according to an estimated value. The control method disclosed in Japanese Patent Laying-Open No. 2004-68809 includes a step of calculating an estimated fluid temperature value of CVVT control oil or fluid (i.e., oil or fluid for CVVT control) based on a cooling water temperature in an initial stage after the start as well as an elapsed time after the start, a step of storing the estimated fluid temperature thus calculated in a memory, and a step of driving the CVVT based on the estimated fluid temperature value thus stored.

However, even when the VVT mechanism is controlled in consideration of the temperature of the hydraulic fluid, as is done in the control-method disclosed in Japanese Patent Laying-Open No. 2004-68809, a sufficient hydraulic pressure may not be supplied to the VVT mechanism because the hydraulic fluid has a low viscosity, e.g., at a high temperature. In this case, the VVT mechanism may malfunction, and the opening/closing timing of the valve may not be controlled accurately.

SUMMARY OF THE INVENTION

An object of the invention is to provide a control device and a control method of an internal combustion engine that can accurately control opening/closing timing of an intake valve and/or an exhaust valve.

A control device according to an aspect of the invention is employed for an internal combustion engine that has a changing mechanism operated by a hydraulic pressure generated by a drive power of the internal combustion engine to change opening/closing timing of at least one of an intake valve and an exhaust valve. The control device includes a sensor sensing a temperature related to a temperature of a hydraulic fluid of the changing mechanism, and an operation unit. The operation unit performs control to attain an output shaft revolution speed of the internal combustion engine equal to or higher than a predetermined lower limit value, and performs setting to increase the lower limit value with increase in the temperature of the hydraulic fluid of the changing mechanism.

According to this structure, the output shaft revolution speed of the internal combustion engine is controlled to be equal to or higher than the predetermined lower limit value. The lower limit value is set higher with increase in temperature of the hydraulic fluid of the changing mechanism. Thereby, as a viscosity of the hydraulic fluid lowers, the output shaft revolution speed of the internal combustion engine can increase to obtain the hydraulic pressure required for operating the changing mechanism. Therefore, the changing mechanism can reliably operates to change the opening/closing timing of the intake valve and/or the exhaust valve. Consequently, it is possible to provide the control device of the internal combustion engine that can accurately control the opening/closing timing of the intake valve and/or the exhaust valve.

Preferably, the operation unit controls the changing mechanism to attain the opening/closing timing matching predetermined target timing, and performs setting to increase the lower limit value with increase in the temperature of the hydraulic fluid of the changing mechanism when the opening/closing timing does not change.

This structure controls the changing mechanism to attain the opening/closing timing matching the predetermined target timing. When the opening/closing timing does not change, the lower limit value is increased with increase in temperature of the hydraulic fluid of the changing mechanism. Thereby, when there is a malfunction in the changing mechanism, the output shaft revolution speed of the internal combustion engine can be increased to obtain a hydraulic pressure required for operating the changing mechanism. Therefore, it is possible to prevent excessive increasing of the output shaft revolution speed of the internal combustion engine.

Further preferably, the sensor senses a temperature of a cooling water of the internal combustion engine. The operation unit estimates the temperature of the hydraulic fluid based on the temperature of the cooling water of the internal combustion engine.

According to this structure, the temperature of the hydraulic fluid can be estimated based on the temperature of the cooling water of the internal combustion engine.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a VVT mechanism.

DESCRIPTION OF THE PREFERRED EMBODIMENTS

Hereinafter reference will be made to the drawings to describe an embodiment of the present invention. In the following description, identical components are identically denoted. Their names and functions are also identical. Accordingly, they will not be described repeatedly in detail.

Figure 1:
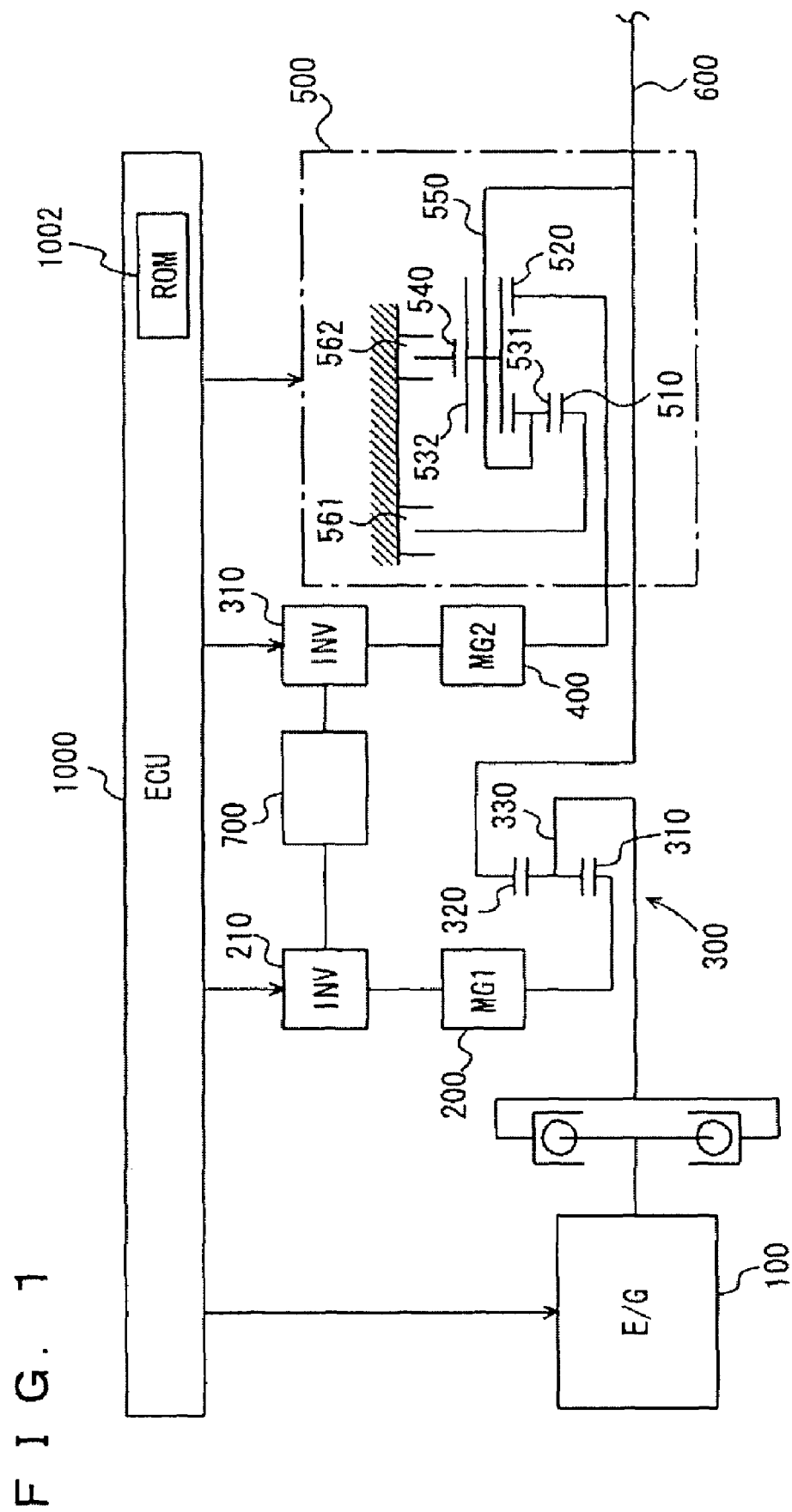
FIG. 1 schematically shows a configuration of a power train of a hybrid vehicle.

With reference to FIG. 1, a power train of a hybrid vehicle provided with a control device according to an embodiment will be described hereinafter. Note that the control device of the present embodiment is implemented for example by an ECU (Electronic Control Unit) 1000 executing a program recorded in a ROM (Read Only Memory) 1002 of ECU 1000.

As shown in FIG. 1, the power train is configured mainly of an engine 100, a MG (Motor Generator) (1) 200, a power split device 300 adding or splitting a torque between engine 100 and MG (1) 200, an MG (2) 400, and a transmission 500.

Engine 100 is a known power device combusting fuel to output power and is configured to allow a throttle angle (an amount of intake air), an amount of fuel supplied, a timing of ignition, and other operation states to be electrically controlled. It is controlled for example by ECU 1000 having a microcomputer serving as a main component.

MG (1) 200 is by way of example a 3-phase alternate current rotating electric machine and configured to provide a function serving as a motor and that serving as a power generator. It is connected via an inverter 210 to a battery or a similar electricity storage device 700. Inverter 210 can be controlled to set a torque output from MG (1) 200 or a regenerative torque thereof, as appropriate. It is controlled by ECU 1000. Note that MG (1) 200 has a stator (not shown) fixed and thus the stator is prevented from rotation.

Power split device 300 is a known gear mechanism causing a differential action such that an externally toothed sungear (S) 310, an internally toothed ring gear (R) 320 arranged concentrically with respect to sungear (S) 310, and a carrier (C) 330 holding a pinion gear, which meshes with sungear (S) 310 and ring gear (R) 320, to rotate and revolve as desired serve as three rotative elements. Engine 100 has an output shaft connected via a damper to a first rotative element, i.e., carrier (C) 330. In other words, carrier (C) 330 acts as an input element.

In contrast, to a second rotative element, i.e., sungear (S) 310, is connected a rotor (not shown) of MG (1) 200. Thus sungear (S) 310 serves as a so-called reaction element, and a third rotative element, i.e., ring gear (R) 320 serves as an output element. Ring gear (R) 320 is connected to an output shaft 600 connected to a driving wheel (not shown).

Figure 2:
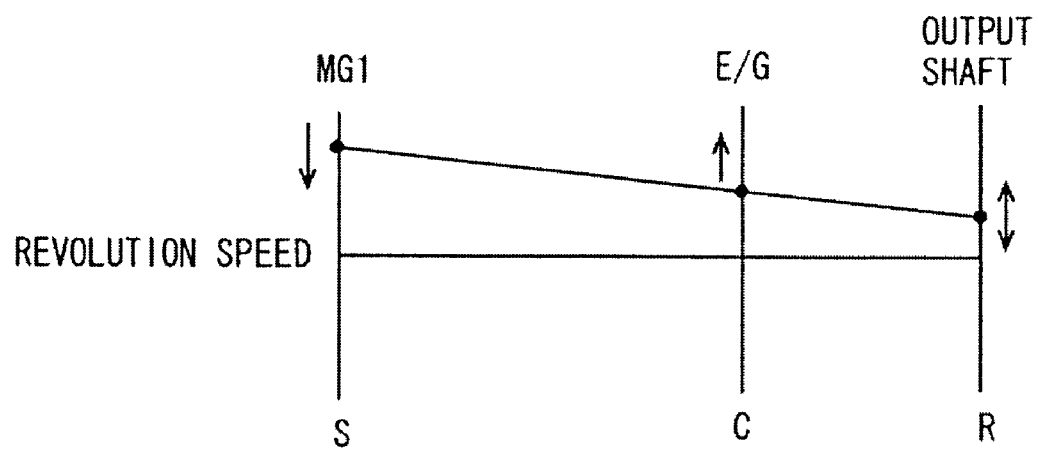
FIG. 2 is a nomographic chart of a power split device.

FIG. 2 is a nomographic chart of power split device 300. As shown in FIG. 2, for a torque output from engine 100 and received by carrier (C) 330, a reactive torque provided by MG (1) 200 is input to sungear (S) 310. These torques are added/subtracted, and a torque of a magnitude thus obtained appears at ring gear (R) 320 serving as the output element. In that case, MG (1) 200 has its rotor rotated by that torque, and MG (1) 200 functions as a power generator. Furthermore, if ring gear (R) 320 has a fixed number of revolutions per minute (i.e., a fixed output revolution speed), changing the revolution speed of MG (1) 200 to be large or small allows engine 100 to have the revolution speed varying continuously (i.e., steplessly). More specifically, MG (1) 200 can be controlled to control engine 100 to achieve the revolution speed of engine 100 for example allowing the best fuel economy. It is controlled by ECU 1000.

If the vehicle is running and engine 100 is stopped, MG (1) 200 rotates backward, and if in that condition MG (1) 200 is controlled to function as a motor and output a torque in the direction of forward rotation, a torque having a direction allowing engine 100 connected to carrier (C) 330 to rotate forward acts on engine 100, and engine 100 can be started (or motored or cranked) by MG (1) 200. In that case, a torque having a direction to stop output shaft 600 from rotating acts on output shaft 600. Thus a drive torque for running can be maintained by controlling a torque output from MG (2) 400 and simultaneously engine 100 can be started smoothly. Note that this type of hybrid system is referred to as a mechanical distribution type or a split type.

With reference again to FIG. 1, MG (2) 400 is by way of example a 3-phase alternate current rotating electric machine and configured to provide a function serving as a motor and that serving as a power generator. It is connected via an inverter 310 to the battery or the similar electricity storage device 700. Inverter 310 can be controlled to control the drive and regenerative states of MG (2) 400 and the torque thereof in each state. Note that MG (2) 400 has a stator (not shown) fixed and thus prevented from rotating.

Transmission 500 is configured of a set of a Ravignaux type of planetary gear mechanisms provided with externally toothed, first and second sungears (S1) 510 and (S) 520, with the first sungear (S1) 510 meshing with a first pinion 531 meshing with a second pinion 532 meshing with a ring gear (R) 540 which and sungears 510 and 520 are arranged concentrically.

Note that each pinion 531, 532 is held by a carrier (C) 550 to be rotated and revolved as desired. Furthermore the second sungear (S2) 520 meshes with the second pinion 532. Thus the first sungear (S1) 510 and ring gear (R) 540 together with pinions 531 and 532 configure a mechanism corresponding to a double-pinion planetary gear mechanism, and the second sungear (S2) 520 and ring gear (R) 540 together with the second pinion 532 configure a mechanism corresponding to a single-pinion planetary gear mechanism.

Furthermore transmission 500 is provided with a B1 brake 561 selectively fixing the first sungear (S1) 510 and a B2 brake 562 selectively fixing ring gear (R) 540. Brakes 561 and 562 are a so-called friction engagement element generating force for engagement by frictional force and can be implemented by an engagement device employing multiple plates or that employing a band. Brakes 561 and 562 are configured to have their respective torque capacities continuously varying with force depending on hydraulic pressure for engagement. Furthermore, to the second sungear (S2) 520, MG (2) 400 is connected. Carrier (C) 550 is connected to output shaft 600.

Thus transmission 500 has the second sungear (S2) 520 serving as a so-called input element and carrier (C) 550 serving as an output element, and B1 brake 561 can be engaged to set a high gear having a gear ratio larger than "1". Disengaging B1 brake 561 and engaging B2 brake 562 sets a low gear having a gear ratio larger than the high gear.

The gears are shifted as based on vehicular speed, driving force required (or accelerator pedal position) and/or a similar running condition. More specifically, a gear range is previously determined in the form of a map (a shift map) and one of the gears is set as controlled in accordance with a driving state detected.

Figure 3:
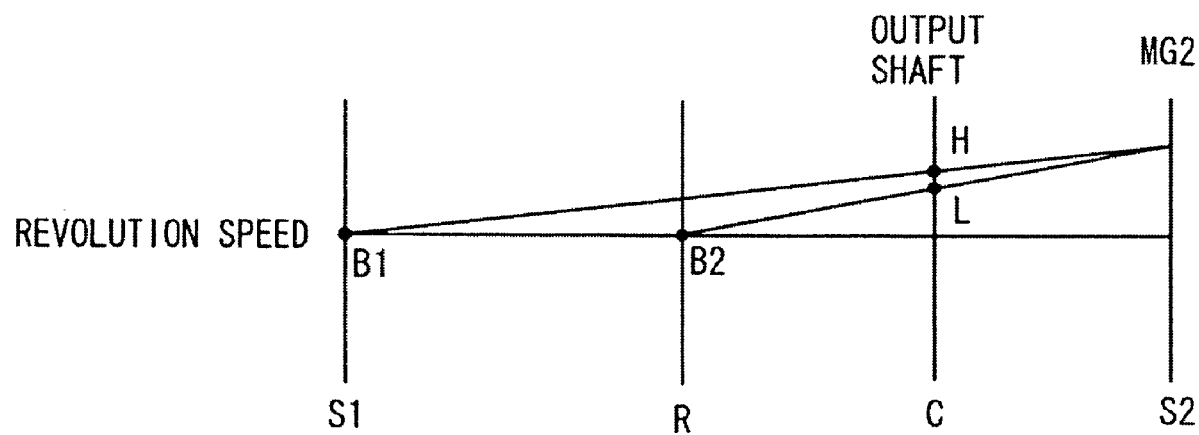
FIG. 3 is a nomographic chart of a transmission.

FIG. 3 is a nomographic chart of transmission 500. As shown in FIG. 3, when B2 brake 562 fixes ring gear (R) 540, a low gear L is set and a torque output from MG (2) 400 is amplified in accordance with a gear ratio and applied to output shaft 600. In contrast, when B1 brake 561 fixes the first sungear (S1) 510 a high gear H having a gear ratio smaller than low gear L is set. The gear ratio of high gear H is also larger than "1", and a torque output from MG (2) 400 is increased in accordance with that gear ratio and applied to output shaft 600.

Note that when gears L and H are normally set, output shaft 600 receives a torque output from MG (2) 400 that is increased in accordance with a gear ratio, whereas when the gears are being shifted, it receives a torque affected for example by the torque capacity at each brake 561, 562, and an inertia torque of MG (2) 400 that accompanies variation in the revolution speed of MG (2) 400. Furthermore when MG (2) 400 is in the driving state output shaft 600 receives a positive torque and when MG (2) 400 is in the driven state output shaft 600 receives a negative torque.

Figure 4:
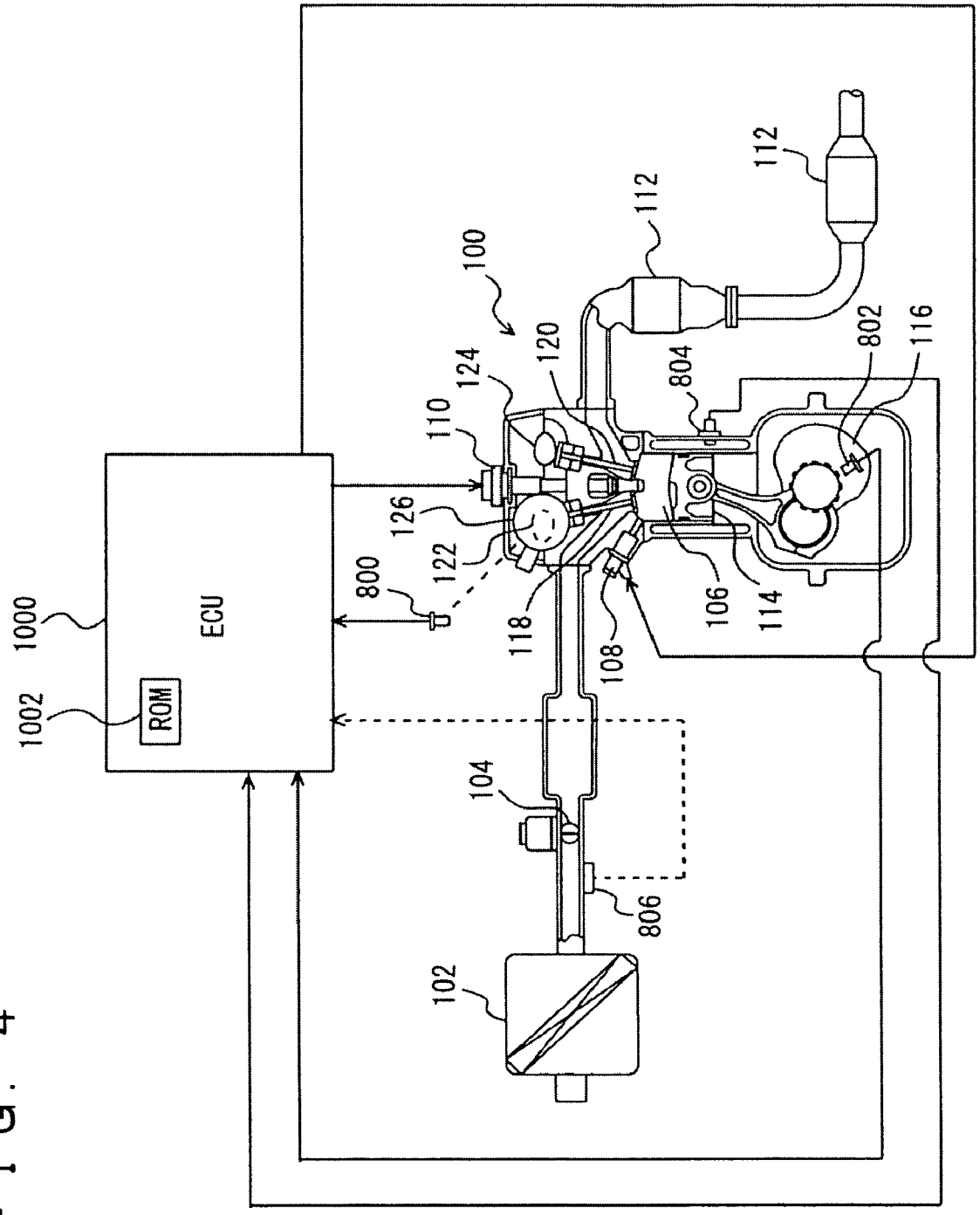
FIG. 4 schematically shows a configuration of an engine of a hybrid vehicle.

Referring to FIG. 4, engine 100 will be described further.

Engine 100 takes in an air from an air cleaner 102. A throttle valve 104 adjusts an intake air flow. Throttle valve 104 is an electronic throttle valve driven by a motor.

The air is mixed with a fuel in a cylinder 106 (combustion chamber). An injector 108 directly injects the fuel into cylinder 106. Thus, injector 108 has an injection port located inside cylinder 106. The fuel is injected from an intake side (from which the air is supplied) of cylinder 106.

The fuel is injected in an intake stroke. It is not restricted that the fuel is injected in the intake stroke. Engine 100 in this embodiment is a direct-injection engine of which injector 108 has the injection port located inside cylinder 106. However, injectors for port injection may be employed in addition to injectors 108 for the direct injection. Further, the engine may employ only the injectors for the port injection.

A spark plug ignites an air-fuel mixture in cylinder 106 to cause combustion. The burnt air-fuel mixture, i.e., an exhaust gas is cleaned by a three-way catalyst 112 and then is discharged from the vehicle. The combustion of the air-fuel mixture depresses a piston 114 to rotate a crank shaft 116.

An intake valve 118 and an exhaust valve 120 are arranged in a head of cylinder 106. Intake valve 118 controls a flow rate of the air supplied into cylinder 106 as well as timing of such air supply. Exhaust valve 120 controls a flow rate of the exhaust gas discharged from cylinder 106 as well as timing of such discharge. A cam 122 drives intake valve 118. A cam 124 drives exhaust valve 120.

A VVT mechanism 126 changes opening/closing timing (phases) of intake valve 118. Exhaust valve 120 may be configured to change opening/closing timing thereof.

In this embodiment, VVT mechanism 126 turns a cam shaft (not shown) provided with cam 122 to control the opening/closing timing of intake valve 118. The method of controlling the opening/closing timing is not restricted to this. In this embodiment, VVT mechanism 126 hydraulically operates.

ECU 1000 controls engine 100. ECU 1000 controls a degree of throttle opening, ignition timing, fuel injection timing, a fuel injection quantity and the opening/closing timing of intake valve 118 so that engine 100 may attain a desired operation state. ECU 1000 receives signals from a cam angle sensor 800, a crank angle sensor 802, a water temperature sensor 804 and an air flowmeter 806.

Cam angle sensor 800 provides a signal indicating a position of the cam. Crank angle sensor 802 provides a signal indicating a revolution speed (engine revolution speed) NE of crank shaft 116 and a rotation angle of crank shaft 116. Water temperature sensor 804 provides a signal indicating a temperature of the cooling water (which may also be referred to as a "water temperature" hereinafter) of engine 100. Air flowmeter 806 provides a signal indicating a flow rate I<L of the air taken into engine 100.

ECU 1000 controls engine 100 based on the signals provided from these sensors as well as the map and programs stored in ROM 1002.

Referring to FIG. 5, VVT mechanism 126 will be further described. VVT mechanism 126 includes a housing 128, a vane 130, an advancing chamber 132 and a retarding chamber 134. Housing 128 is coupled to crank shaft 116 through a chain or belt. Housing 128 rotates at half an engine revolution speed.

Vane 130 is rotatably carried inside housing 128. Vane 130 is fixed to the cam shaft for rotation therewith. When vane 130 rotates relatively to housing 128, the opening/closing timing of intake valve 118 is angularly advanced or retarded.

Advancing chamber 132 is a space defined by housing 128 and vane 130. When a hydraulic pressure is supplied to advancing chamber 132, vane 130 turns clockwise in FIG. 5 to advance the opening/closing timing of intake valve 118.

Retarding chamber 134 is a space defined by housing 128 and vane 130. When a hydraulic pressure is supplied to retarding chamber 134, vane 130 turns counterclockwise in FIG. 5 to retard the opening/closing timing of intake valve 118.

Figure 6:
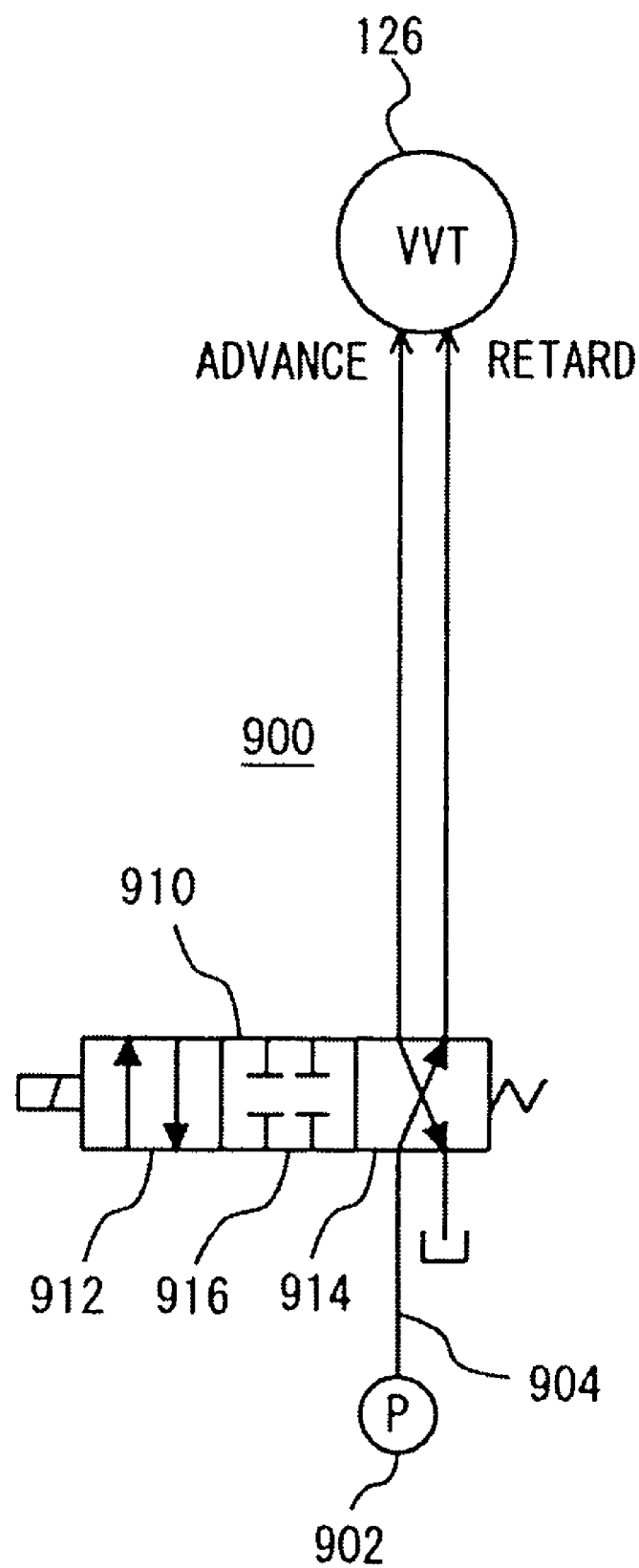
FIG. 6 shows a hydraulic circuit supplying a hydraulic pressure to the VVT mechanism.

Referring to FIG. 6, a hydraulic circuit 900 supplying a hydraulic pressure to VVT mechanism 126 will now be described. Hydraulic circuit 900 includes an oil pump 902, an oil passage 904 and an OCV (Oil Control Valve) 910.

Oil pump 902 is coupled to crank shaft 116, and is driven by engine 100 to generate a hydraulic pressure, which is supplied to oil passage 904. The pressure in oil passage 904 is supplied to advancing chamber 132 or retarding chamber 134.

OCV 910 is an electromagnetic spool valve having an advancing region 912, a retarding region 914 and a cut-off region 916. In advancing region 912, OCV 910 supplies the hydraulic pressure in oil passage 904 into advancing chamber 132, and drains the hydraulic pressure in retarding chamber 134. This operation advances the opening/closing timing of intake valve 118.

In retarding region 914, OCV 910 supplies the hydraulic pressure in oil passage 904 into retarding chamber 134, and drains the hydraulic pressure in advancing chamber 132. This operation retards the opening/closing timing of intake valve 118. Further, in cut-off region 916, OCV 910 cuts off VVT mechanism 126 from oil passage 904.

Figure 7:
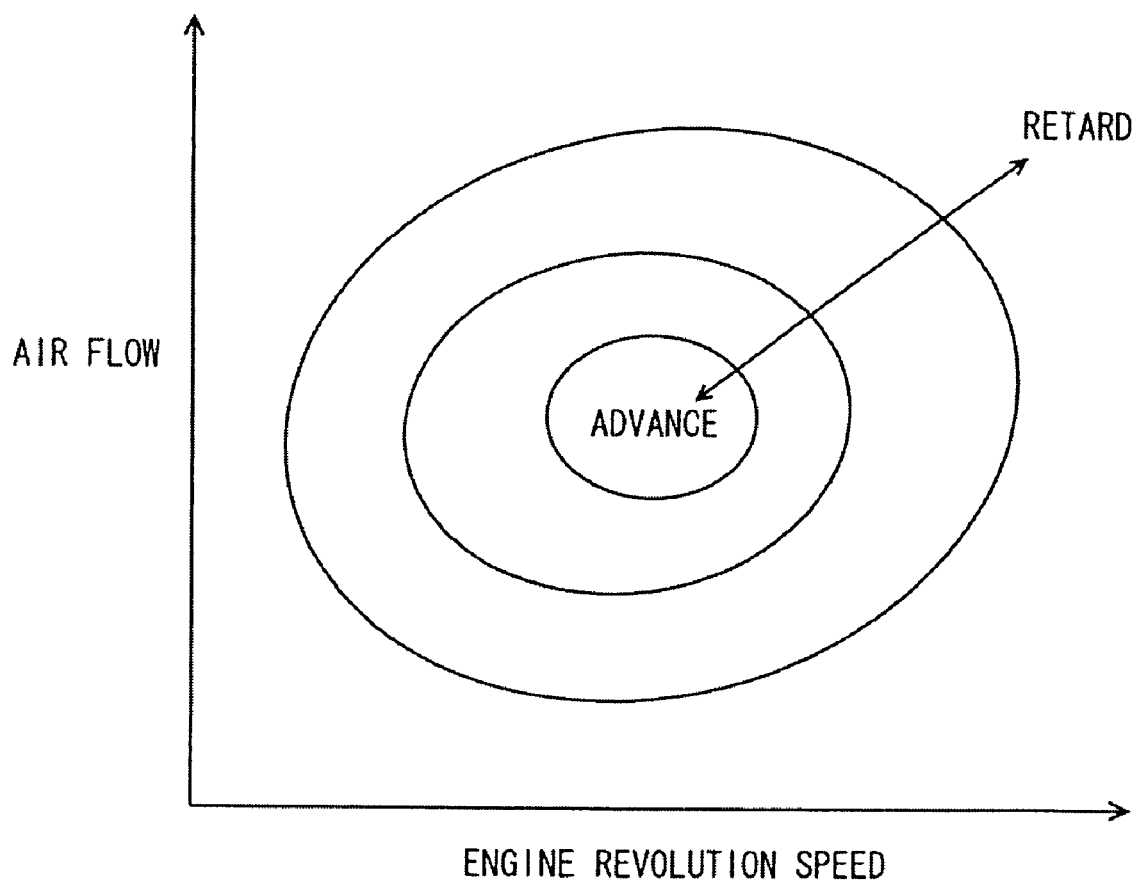
FIG. 7 shows a map determining target timing of opening/closing timing of an intake valve.

In this embodiment, ECU 1000 determines target timing of the opening/closing timing of intake valve 118 based on a map in which engine revolution speed NE and flow rate IL of the air taken into engine 100 are used as parameters as described in FIG. 7. VVT mechanism 126 is controlled so that the opening/closing timing of intake valve 118 may match the target timing.

Figure 8:
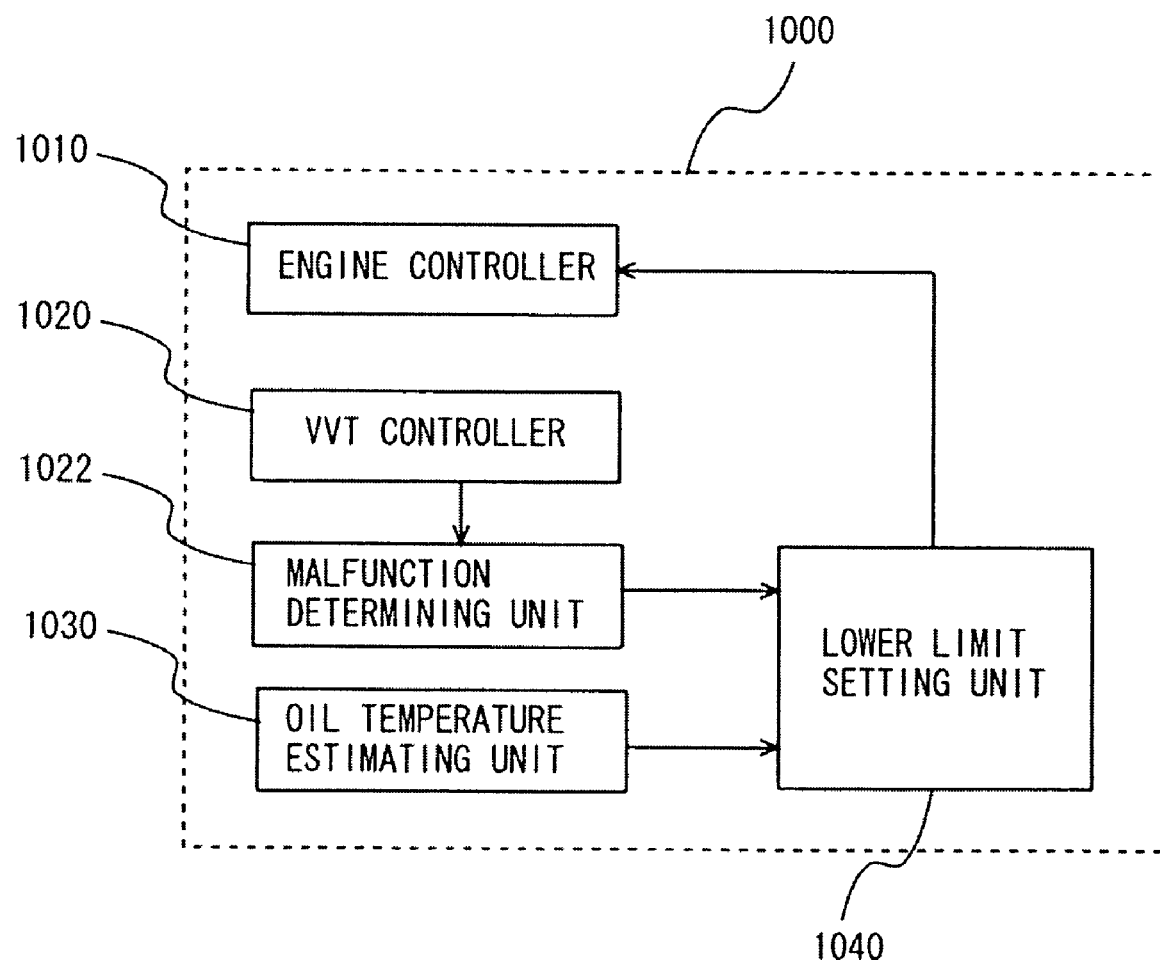
FIG. 8 is a functional block diagram of an ECU in a first embodiment of the invention.

Referring to FIG. 8, a function of ECU 1000 will now be described. The function of ECU 1000 to be described below may be implemented by hardware or software.

ECU 1000 includes an engine controller 11010, a VVT controller 1020, a malfunction determining unit 1022, an oil temperature estimating unit 1030 and a lower limit setting unit 1040.

Engine controller 1010 controls engine 100 to attain engine revolution speed NE equal to or higher than a lower limit value set by lower limit setting unit 1040. VVT controller 1020 controls VVT mechanism 126 so that the opening/closing timing of intake valve 118 may match the target timing determined by the map in FIG. 7 already described. Thus, OCV 910 is controlled to supply to VVT mechanism 126 the hydraulic pressure that attains the opening/closing timing of intake valve 118 matching the target timing.

Malfunction determining unit 1022 determines that VVT mechanism 126 malfunctioned when the opening/closing timing does not change within a predetermined time T(0) after VVT mechanism 126 is controlled to change the opening/closing timing of intake valve 118. This determination whether the opening/closing timing of intake valve 118 changed or not is made, e.g., by determining whether a change occurred in relative relationship between the position of the cam sensed by cam angle sensor 800 and the rotation angle of crank shaft 116 sensed by crank angle sensor 802 or not. The method of determining whether the opening/closing timing of intake valve 118 changed or not is not restricted to the above method.

Oil temperature estimating unit 1030 estimates the temperature (which may also be referred to as an "oil temperature" hereinafter) of the hydraulic fluid supplied to VVT mechanism 126. The oil temperature is estimated, e.g., according to a map that is prepared in advance based on simulations or experiments.

Lower limit setting unit 1040 sets the lower limit value of engine revolution speed NE based on the estimated oil temperature. The lower limit value increases with the oil temperature. In the state where it is determined that VVT mechanism 126 is malfunctioning, when the oil temperature is equal to or higher than a threshold THO(0), NE(1) is set to the lower limit value of engine revolution speed NE. When the oil temperature is lower than threshold THO(0), NE(2) (NE(2) <NE(1)) is set to the lower limit value of engine revolution speed NE. The initial value of the lower limit value is, e.g., NE(2).

Figure 9:
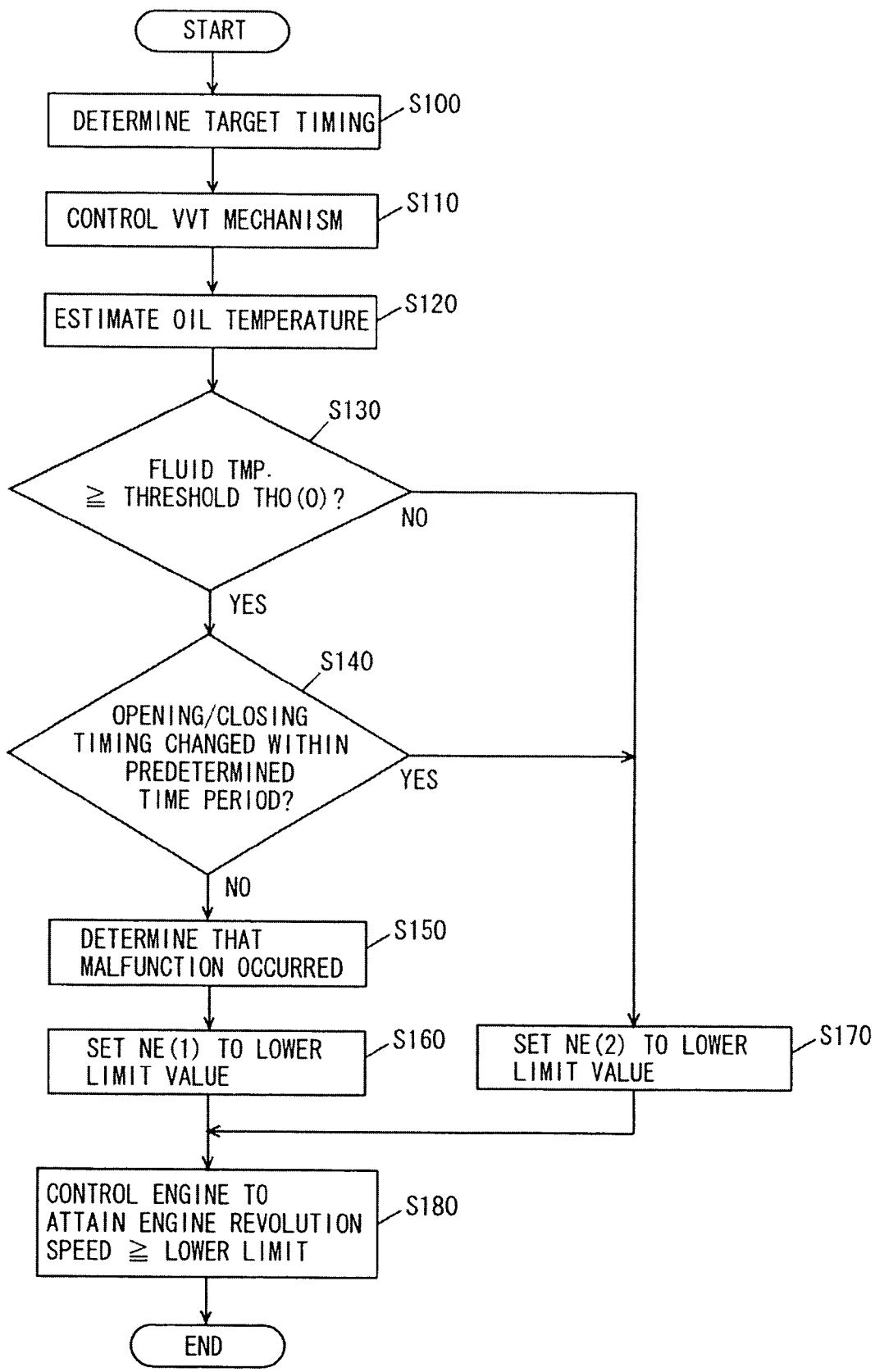
FIG. 9 is a flowchart (1) representing a control structure of a program executed by an ECU in the first embodiment of the invention.

Referring to FIG. 9, description will now be given on a control structure of the program executed by ECU 1000. The program described below is repeated on a predetermined cycle.

In a step (which may also be simply represented by "S" hereinafter) S100, ECU 1000 determines the target timing of the opening/closing timing of intake valve 118. In step S110, ECU 1000 controls VVT mechanism 126 so that the opening/closing timing of intake valve 118 changes to match the target timing.

In step S120, ECU 1000 estimates the oil temperature based on the water temperature sensed by water temperature sensor 804. In step S130, ECU 1000 determines whether the oil temperature is equal to or higher than threshold THO(0) or not. When the oil temperature is equal to or higher than threshold THO(O) (YES in S130), the process proceeds to step S140. Otherwise (NO in S130), the process proceeds to step S170.

In step S140, ECU 1000 determines whether the opening/closing timing actually changed within a predetermined time period after VVT mechanism 126 is controlled to change the opening/closing timing of intake valve 118 to the target timing. When the opening/closing timing changed (YES in S140), the process proceeds to step S170. Otherwise (NO in S140), the process proceeds to step S150. In step S150, ECU 1000 determines that the VVT mechanism 126 malfunctioned.

In step S160, ECU 1000 sets NE(1) to the lower limit value of engine revolution speed NE. In step S170, ECU 1000 sets NE(2) to the lower limit value of engine revolution speed NE.

In step S180, ECU 1000 controls engine 100 to attain engine revolution speed NE equal to or lower than the lower limit value.

Based on the structure and flowchart described above, ECU 1000 that is the control device according to the embodiment operates as follows.

When engine 100 is operating, the target timing of the opening/closing timing of intake valve 118 is determined (S100). VVT mechanism 126 is controlled to change the opening/closing timing of intake valve 118 to the target timing thus determined (S110).

The oil temperature is estimated based on the water temperature sensed by water temperature sensor 804 (S120). When the oil temperature is equal to or higher than threshold THO(0) (YES in S130), the viscosity of the hydraulic fluid is low. In this state, oil pump 902 may not sufficiently increase the hydraulic pressure. When the hydraulic pressure is low, such a situation may occur that the hydraulic pressure required for operating VVT mechanism 126 is not obtained and VVT mechanism 126 does not operate.

Accordingly, after VVT mechanism 126 is controlled to change the opening/closing timing of intake valve 118 to the target timing, it is determined whether the opening/closing timing actually changed within a predetermined time period or not (S140).

When the opening/closing timing did not change (NO in S140), it is determined that VVT mechanism 126 malfunctioned (S150). In this case, NE(1) is set to the lower limit value of engine revolution speed NE (S160). Thus, the lower limit value of engine revolution speed NE is set higher than NE(2) that is the initial value.

Engine 100 is controlled to attain engine revolution speed NE equal to or lower than the lower limit value thus set (S180). This can increase the drive power applied to oil pump 902, and thereby can increase the hydraulic pressure supplied to VVT mechanism 126. Consequently, the hydraulic pressure required for operating VVT mechanism 126 is obtained, and VVT mechanism 126 can reliably operate.

Conversely, when the oil temperature is lower than threshold THO(0) (NO in S130), the viscosity of the hydraulic fluid is high so that the possibility that the hydraulic pressure is insufficient is low. Even when the oil temperature is equal to or higher than threshold THO(0), the opening/closing timing may change (YES in S140). In this case, it can be considered that an enough hydraulic pressure is attained, and it is not necessary to increase the hydraulic pressure.

Accordingly, NE(2), i.e., the initial value is set as the lower limit value of engine revolution speed NE as it is (S170). This can prevent excessive increase of engine revolution speed NE.

As described above, the ECU that is the control device according to the embodiment increases the lower limit value of engine revolution speed NE when the oil temperature is equal to or higher than threshold THO(0). Thereby, when the viscosity of the hydraulic fluid is low, the ECU can increase engine revolution speed NE to obtain the hydraulic pressure required for operating the VVT mechanism. Therefore, the VVT mechanism can operate reliably to change the opening/closing timing of the intake valve. Consequently, the opening/closing timing of the intake valve can be accurately controlled.

Figure 10:
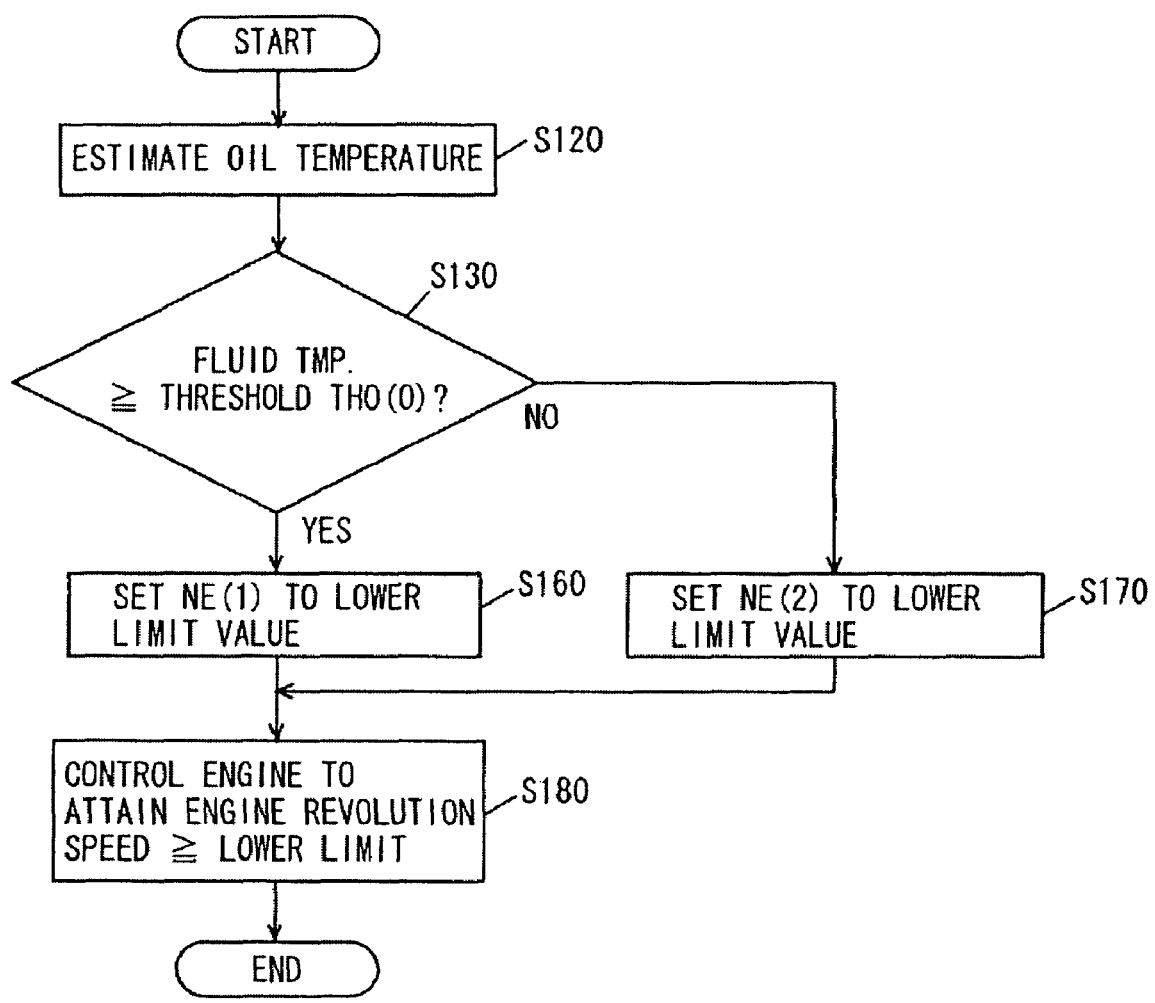
FIG. 10 a flow chart (2) representing the control structure of the program executed by the ECU in the first embodiment of the invention.

Instead of determining whether the opening/closing timing changed or not, a manner illustrated in FIG. 10 may be employed. In this manner, when the oil temperature is equal to or higher than threshold THO(0) (YES in S130), NE(1) is set to the lower limit value of engine revolution speed NE (S160). When the oil temperature is lower than threshold THO(0) (NO in S130), NE(2) is set to the lower limit value of engine revolution speed NE (S170).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control device of an internal combustion engine in a hybrid vehicle having a power split device and a motor generator, the control device having a changing mechanism operated by a hydraulic pressure generated by a drive power of the internal combustion engine to change opening/closing timing of at least one of an intake valve and an exhaust valve, comprising:
    a sensor sensing a temperature related to a temperature of a hydraulic fluid of said changing mechanism; and
    an operation unit, wherein
    said operation unit performs a control operation to attain an engine speed of said internal combustion engine equal to or higher than a predetermined lower limit value, and
    performs setting to increase said lower limit value with increase in the temperature of the hydraulic fluid of said changing mechanism.

2. The control device of the internal combustion engine according to claim 1, wherein
    said operation unit controls said changing mechanism to attain said opening/closing timing matching predetermined target timing, and
    performs setting to increase said lower limit value with increase in the temperature of the hydraulic fluid of said changing mechanism when said opening/closing timing does not change.

3. The control device of the internal combustion engine according to claim 1, wherein
    said sensor senses a temperature of a cooling water of said internal combustion engine,
    said operation unit estimates the temperature of said hydraulic fluid based on the temperature of the cooling water of said internal combustion engine.

4. A control device of an internal combustion engine in a hybrid vehicle having a power split device and a motor generator, the control device having a changing mechanism operated by a hydraulic pressure generated by a drive power of the internal combustion engine to change opening/closing timing of at least one of an intake valve and an exhaust valve, comprising:
    means for performing a control operation to attain an engine speed of said internal combustion engine equal to or higher than a predetermined lower limit value, and
    setting means for performing setting to increase said lower limit value with increase in temperature of a hydraulic fluid of said changing mechanism.

5. The control device of the internal combustion engine according to claim 4, further comprising:
    means for controlling said changing mechanism to attain said opening/closing timing matching predetermined target timing, wherein
    said setting means includes means for performing setting to increase said lower limit value with increase in temperature of the hydraulic fluid of said changing mechanism when said opening/closing timing does not change.

6. The control device of the internal combustion engine according to claim 4, further comprising:
    means for estimating a temperature of said hydraulic fluid based on a temperature of a cooling water of said internal combustion engine.

7. A control method of an internal combustion engine in a hybrid vehicle having a power split device, a motor generator and a changing mechanism operated by a hydraulic pressure generated by a drive power of the internal combustion engine to change opening/closing timing of at least one of an intake valve and an exhaust valve, comprising the steps of:
    performing a control operation to attain an engine speed of said internal combustion engine equal to or higher than a predetermined lower limit value, and
    performing setting to increase said lower limit value with increase in temperature of a hydraulic fluid of said changing mechanism.

8. The control method of the internal combustion engine according to claim 7, further comprising:
    a step of controlling said changing mechanism to attain said opening/closing timing matching predetermined target timing, wherein
    said step of setting said lower limit value includes a step of performing setting to increase said lower limit value with increase in temperature of the hydraulic fluid of said changing mechanism when said opening/closing timing does not change.

9. The control method of the internal combustion engine according to claim 7, further comprising:
    a step of estimating a temperature of said hydraulic fluid based on a temperature of a cooling water of said internal combustion engine.

* * * * *

UNITED STATES PATENT AND TRADEMARK OFFICE
CERTIFICATE OF CORRECTION

PATENT NO. : 7,661,398 B2
APPLICATION NO. : 11/907181
DATED : February 16, 2010
INVENTOR(S) : Hikokazu Akimoto It is certified that error appears in the above-identified patent and that said Letters Patent is hereby corrected as shown below:

| Column | Line | |
|---|---|---|
| 6 | 8 | Change "I<L" to --KL--. |
| 6 | 56 | Change "IL" to --KL--. |
| 6 | 59 | Change "controller 11010" to --controller 1010--. |

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,661,398 B2 Page 1 of 1
APPLICATION NO. : 11/907181
DATED : February 16, 2010
INVENTOR(S) : Hikokazu Akimoto It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 148 days.

Signed and Sealed this

Twenty-second Day of June, 2010

David J. Kappos
*Director of the United States Patent and Trademark Office*